United States Patent
Wakabayashi et al.

(10) Patent No.: US 11,449,463 B2
(45) Date of Patent: Sep. 20, 2022

(54) ANALYSIS DATABASE REGISTRATION DEVICE, ANALYSIS DATA COLLECTION SYSTEM, ANALYSIS SYSTEM AND ANALYSIS DATABASE REGISTRATION METHOD

(71) Applicant: SHIMADZU CORPORATION, Kyoto (JP)

(72) Inventors: Kazuhito Wakabayashi, Kyoto (JP); Takayuki Nakatani, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 299 days.

(21) Appl. No.: 16/152,513

(22) Filed: Oct. 5, 2018

(65) Prior Publication Data

US 2019/0108233 A1    Apr. 11, 2019

(30) Foreign Application Priority Data

Oct. 6, 2017 (JP) .............................. JP2017-195745

(51) Int. Cl.
    *G06F 16/13* (2019.01)
    *G06F 16/17* (2019.01)
(52) U.S. Cl.
    CPC .......... *G06F 16/13* (2019.01); *G06F 16/1727* (2019.01)
(58) Field of Classification Search
    CPC .............................. G06F 16/13; G06F 16/1727
    See application file for complete search history.

(56) References Cited

U.S. PATENT DOCUMENTS

| 6,023,506 A * | 2/2000 | Ote ..................... G06F 21/6209 380/45 |
| 2004/0039706 A1* | 2/2004 | Skowron ................ G06Q 10/10 705/51 |
| 2005/0240586 A1* | 10/2005 | Sakata .................. G06F 3/1289 707/999.008 |
| 2007/0141976 A1 | 6/2007 | Shimakawa et al. |

(Continued)

FOREIGN PATENT DOCUMENTS

| JP | 2008-051565 A | 3/2008 |
| JP | 2009-93632 A | 4/2009 |
| JP | 2014-186782 A | 10/2014 |

(Continued)

OTHER PUBLICATIONS

Examination Report dated Aug. 19, 2020 from the Intellectual Property Office of India in Application No. 201844037630.

(Continued)

*Primary Examiner* — Kannan Shanmugasundaram
(74) *Attorney, Agent, or Firm* — Sughrue Mion, PLLC

(57) ABSTRACT

A save folder to be used in order for an analysis data acquisition device to save an analysis data file in a storage is created by a creator. When a file determiner determines that the analysis data file is saved in the created save folder, the analysis data file saved in the save folder is registered by a registrator in an analysis database of a database storage device. When an end determiner determines that an instruction for ending registration of the analysis data file in the analysis database has been given, a region processor makes the save folder unavailable for the registration of the analysis data file in the analysis database.

8 Claims, 6 Drawing Sheets

(56) References Cited

U.S. PATENT DOCUMENTS

2009/0077334 A1\* 3/2009 Ishida .................... G06F 21/80
 711/163
2009/0083469 A1 3/2009 Tanaka

FOREIGN PATENT DOCUMENTS

JP 2016-39610 A 3/2016
TW I249689 B 2/2006

OTHER PUBLICATIONS

Notice of Reasons for Refusal dated Mar. 23, 2021 from the Japanese Patent Office in JP Application Machine No. 2017-195745 Translation.
Notice of Decision of Refusal dated Apr. 8, 2022 from the China National Intellectual Property Administration in CN Application No. 201811150288.5.
Communication dated Oct. 28, 2021 from the China National Intellectual Property Administration in English Chinese Application No. 201811150288.5 Translation.

\* cited by examiner

FIG. 3

ANALYSIS DATABASE REGISTRATION PROGRAM

NAME OF ANALYSIS DEVICE: DEVICE 1

| DATA | LOG | REGISTRATION INFORMATION | EXTERNAL APPLICATION | PDF |

IMPORT FOLDER (SAVE FOLDER)
C:¥AAAA¥BBBB¥CCCC¥DDDD

OK   CANCEL   HELP

ANALYSIS DATABASE REGISTRATION DEVICE, ANALYSIS DATA COLLECTION SYSTEM, ANALYSIS SYSTEM AND ANALYSIS DATABASE REGISTRATION METHOD

BACKGROUND OF THE INVENTION

Field of the Invention

The present invention relates to an analysis database registration device, an analysis data collection system, an analysis system and an analysis database registration method for registering analysis data acquired by an analysis device.

Description of Related Art

In an analysis device, various analysis of a sample to be measured is carried out. In recent years, an analysis system in which an analysis device is connected to a network together with a control device and a server has been suggested. In such an analysis system, the data indicating results of analysis carried out by the analysis device is registered in the server, so that the data is integrally managed.

For example, in a network-type analysis system described in JP 2008-51565 A, an analysis device, an analysis control server and a database server are connected to a network. Results of analysis that are output sequentially from the analysis device are saved in the analysis control server, and the saved results of analysis are stored (registered) in the database server as one set of output analysis data from the analysis control server after the analysis is completed.

BRIEF SUMMARY OF THE INVENTION

Generally, an analysis system includes an analysis application program for allowing an analysis device to carry out analysis, and a registration application program for registering output analysis data in a database server. When the analysis application program is started with the registration application program being executed, the analysis is started by the analysis device, and results of analysis that are output from the analysis device are registered in the database server at a time point of being confirmed as the output analysis data. With this configuration, the output analysis data acquired by the analysis application program is sequentially registered in the database server by the registration application program. Thus, there is no room for modification such as falsification of the output analysis data registered in the database server, and reliability of the output analysis data is guaranteed.

However, when the analysis application program is started with the registration application program not being executed, the output analysis data is not registered in the database server. Thus, the output analysis data continues to be saved in an analysis control server. In this state, the output analysis data becomes vulnerable in terms of security, and a specific user can falsify the output analysis data saved in the analysis control server. Therefore, even when the output analysis data saved in the analysis control server is registered in the database server afterwards by the start of the registration application program, the reliability of the output analysis data cannot be guaranteed.

An object of the present invention is to provide an analysis database registration device capable of improving reliability of analysis data registered in a database, an analysis data collection system and an analysis system in which the reliability of the analysis data registered in the database can be improved, and an analysis database registration method with which the reliability of the analysis data registered in the database can be improved.

(1) An analysis database registration device according to one aspect of the present invention that registers an analysis data file including analysis data acquired by an analysis data acquisition device from an analysis device in an analysis database via a storage includes a creator that creates a save region to be used in order for the analysis data acquisition device to save the analysis data file in the storage, a first determiner that determines whether the analysis data file is saved in the save region created by the creator, a registrator that registers the analysis data file that is saved in the save region in the analysis database when the first determiner determines that the analysis data file is saved in the save region, a second determiner that determines whether an instruction for ending registration of the analysis data file in the analysis database by the registrator has been given, and a region processor that makes the save region created by the creator unavailable for the registration of the analysis data file in the analysis database when the second determiner determines that the instruction for ending the registration of the analysis data file has been given.

In this analysis database registration device, the save region to be used in order for the analysis data acquisition device to save the analysis data file is created in the storage. The analysis data acquisition device saves the analysis data file including the analysis data acquired from the analysis device in the created save region. When determination is made that the analysis data file is saved in the save region, the analysis data file is registered in the analysis database. Further, when determination is made that the instruction for ending the registration of the analysis data file is given, the save region is made unavailable for the registration of the analysis data file in the analysis database.

With this configuration, when the analysis database registration device is in operation, the analysis data acquisition device can save the analysis data file in the save region created by the analysis database registration device. On the other hand, when the analysis database registration device is not in operation, the save region to be used in order for the analysis data acquisition device to save the analysis data file does not exist. Therefore, the analysis data file is not saved in the save region by the analysis data acquisition device. While the analysis data file saved in the save region created by the analysis database registration device is registered in the analysis database, the analysis data file saved in another region is not registered in the analysis database. Thus, the analysis data file left vulnerable in terms of security is prevented from being registered in the analysis database. As a result, reliability of the analysis data registered in the analysis database can be improved.

(2) The region processor may delete the save region created by the creator when the second determiner determines that the instruction for ending the registration of the analysis data file has been given. In this case, the save region can be easily made unavailable for the registration of the analysis data file in the analysis database.

(3) The analysis database registration device may further include a designator that designates a location of the save region to be created by the creator and identification information for identifying the save region based on a user operation, wherein the creator may create the save region in the storage based on the location of the save region and the identification information that are designated by the designator. In this case, the user can create the save region in a desired location in the storage.

(4) The analysis database registration device may further include a region mover that moves an existing save region to another location when the save region identified by the identification information already exists in the location designated by the designator. With this configuration, even when the save region already exists in the location designated in the storage, it is possible to create a save region in the designated location without deleting the existing save region. In this case, the data that is saved in the existing save region is prevented from being registered in the analysis database, and the data saved in the existing save region is prevented from being erased.

(5) An analysis data collection system according to another aspect of the present invention that collects an analysis data file including analysis data acquired by an analysis device as an analysis database includes an analysis data acquisition device that acquires analysis data from the analysis device, a storage, and the analysis database registration device according to the one aspect of the present invention that registers the analysis data file including the analysis data acquired by the analysis data acquisition device in the analysis database via the storage, wherein the analysis data acquisition device saves the analysis data file including the analysis data acquired from the analysis device in a save region created in the storage by the analysis database registration device.

In this analysis data collection system, when the analysis database registration device is in operation, the analysis data acquisition device can save the analysis data file in the save region created by the analysis database registration device. On the other hand, when the analysis database registration device is not in operation, the save region to be used in order for the analysis data acquisition device to save the analysis data file does not exist. Therefore, the analysis data file is not saved in the save region by the analysis data acquisition device. While the analysis data file saved in the save region created by the analysis database registration device is registered in the analysis database, the analysis data file saved in another region is not registered in the analysis database. Thus, the analysis data file left vulnerable in terms of security is prevented from being registered in the analysis database. As a result, reliability of the analysis data registered in the analysis database can be improved.

(6) An analysis system according to yet another aspect of the present invention includes an analysis device that acquires analysis data indicating a result of analysis by analyzing a sample, a database storage device that stores an analysis database, and the analysis data collection system according to the other aspect of the present invention that collects an analysis data file including analysis data acquired by the analysis device as an analysis database, wherein the registrator of the analysis data collection system registers an analysis data file that is saved in the save region in the analysis database of the database storage device.

In this analysis system, the analysis data file including the analysis data acquired by the analysis device is collected by the analysis data collection system and registered in the analysis database of the database storage device. In the analysis data collection system, the analysis data file left vulnerable in terms of security is prevented from being registered in the analysis database. As a result, the reliability of the analysis data registered in the analysis database can be improved.

(7) An analysis database registration method according to yet another aspect of the present invention for registering an analysis data file including analysis data acquired by an analysis data acquisition device from an analysis device in an analysis database via a storage includes creating a save region to be used in order for the analysis data acquisition device to save the analysis data file in the storage, determining whether the analysis data file is saved in the created save region, registering the analysis data file that is saved in the save region in the analysis database when determination is made that the analysis data file is saved in the save region, determining whether an instruction for ending registration of the analysis data file in the analysis database has been given; and making the save region unavailable for the registration of the analysis data file in the analysis database when determination is made that the instruction for ending the registration of the analysis data file has been given.

With this analysis database registration method, the analysis data file left vulnerable in terms of security is prevented from being registered in the analysis database. As a result, reliability of the analysis data registered in the analysis database can be improved.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWING

FIG. 3 is a diagram showing one example of a save location designation screen in a registration process;

DESCRIPTION OF THE PREFERRED EMBODIMENTS

An analysis database registration device, an analysis data collection system and an analysis system including the analysis database registration device, and an analysis database registration method according to an embodiment of the present invention will be described below in detail with reference to drawings.

(1) Configuration of Analysis System

Figure 1:
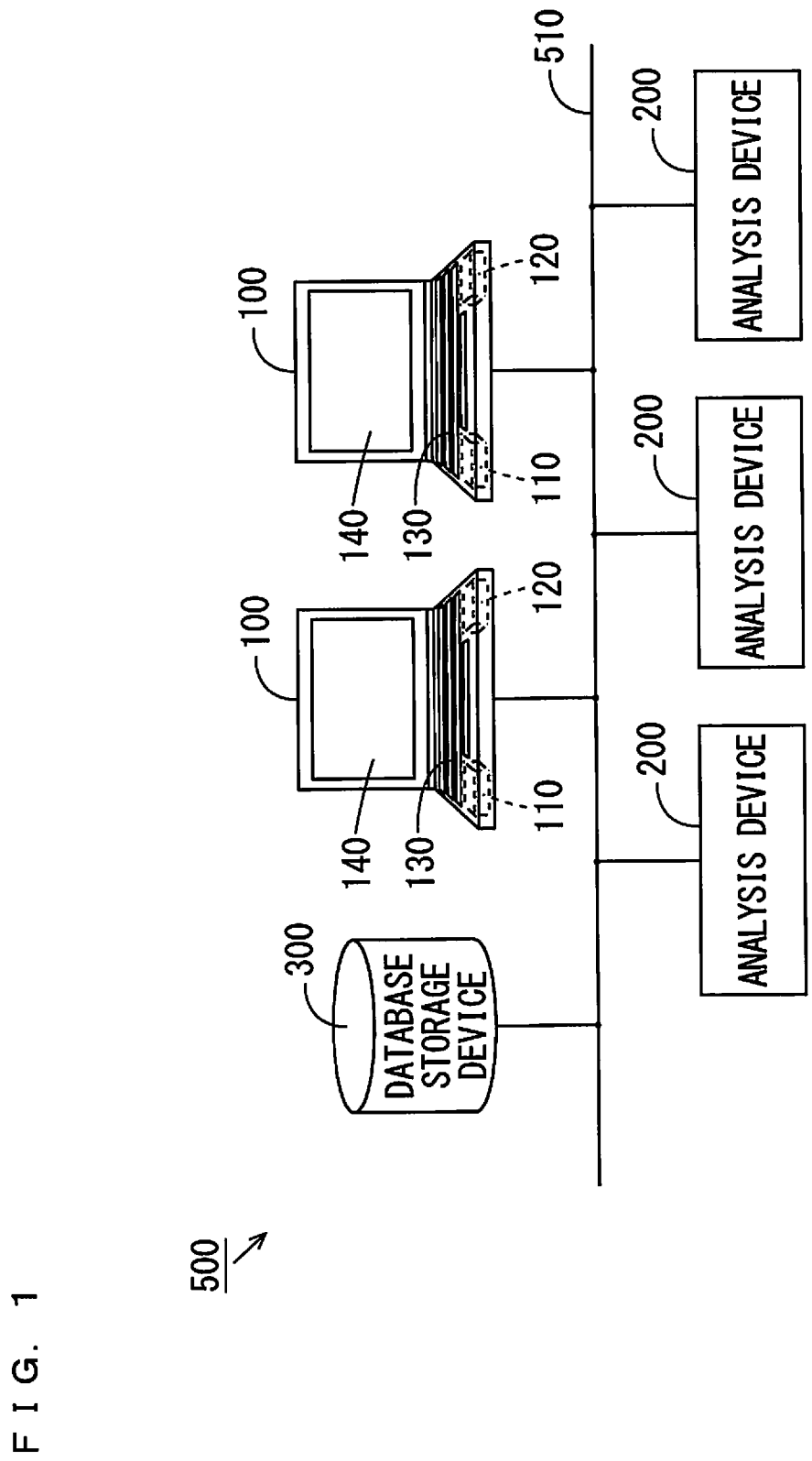
FIG. 1 is a diagram showing a configuration of an analysis system according to an embodiment of the present invention.

FIG. 1 is a diagram showing a configuration of the analysis system according to the embodiment of the present invention. As shown in FIG. 1, the analysis system 500 includes one or more analysis data collection systems 100, one or more analysis devices 200 and a database storage device 300. Each analysis data collection system 100, each analysis device 200 and the database storage device 300 are connected to a network 510 to be communicable with one another.

Each analysis data collection system 100 is realized by a computer such as a personal computer, and includes a controller 110, a storage 120, an operation unit 130 and a display 140. The controller 110 includes a CPU (Central Processing Unit). The storage 120 is constituted by a RAM (Random Access Memory), a ROM (Read Only Memory), an HDD (Hard Disc Drive) and the like. Various data and various programs are stored in the storage 120.

The operation unit 130 includes a pointing device such as a mouse, and a keyboard, for example, and is operated by a user in order for the user to give an instruction to the controller 110. The display 140 includes an LCD (Liquid Crystal Display) panel or an organic EL (Electroluminescense) panel, for example, and displays an image such as a GUI (Graphical User Interface). Details of the analysis data collection system 100 will be described below.

Each analysis device 200 includes a liquid chromatograph, a gas chromatograph or a mass spectrometer, for example. The analysis device 200 carries out various analysis of a sample to be measured, and supplies analysis data indicating results of analysis to the analysis data collection system 100. The database storage device 300 includes a mass storage device such as a server. An analysis database is built in this database storage device 300. The analysis data collection system 100 allows the analysis database of the database storage device 300 to store an analysis data file including one or a plurality of analysis data pieces supplied from the analysis device 200. Thus, the analysis data file is registered in the analysis database.

(2) Analysis Data Collection System

Figure 2:
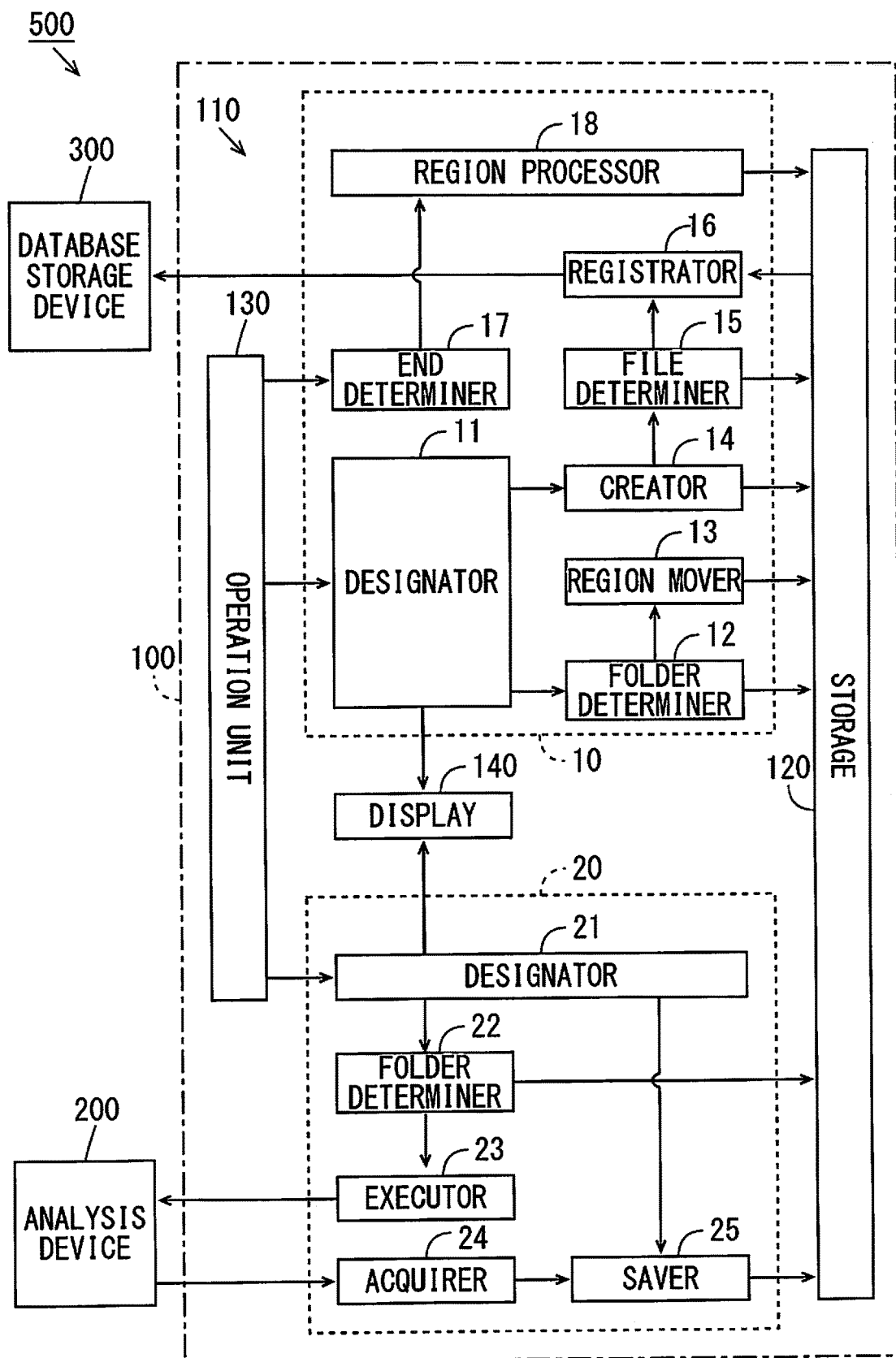
FIG. 2 is a block diagram showing a functional configuration of an analysis data collection system.

FIG. 2 is a block diagram showing a functional configuration of the analysis data collection system 100. As shown in FIG. 2, the analysis data collection system 100 includes an analysis database registration device 10 that performs an analysis database registration process (hereinafter abbreviated as a registration process) and an analysis data acquisition device 20 that performs an analysis data acquisition process (hereinafter abbreviated as an analysis process). While the analysis database registration device 10 and the analysis data acquisition device 20 are included in a common computer in the present embodiment, the present invention is not limited to this. The analysis database registration device 10 and the analysis data acquisition device 20 may be included in separate computers. In this case, the analysis data collection system 100 is constituted by a plurality of computers.

The analysis database registration device 10 includes a designator 11, a folder determiner 12, a region mover 13, a creator 14, a file determiner 15, a registrator 16, an end determiner 17 and a region processor 18. The controller 110 executes an analysis database registration program stored in the storage 120, whereby functions of constituent elements (11 to 18) of the analysis database registration device 10 are implemented. Part or all of the constituent elements (11 to 18) of the analysis database registration device 10 may be constituted by hardware such as an electronic circuit.

The designator 11 allows the display 140 to display a GUI for designation of a save location of an analysis data file in the storage 120 based on a user operation of the operation unit 130. Here, the save location includes the identification information of the save folder in which the analysis data file is to be saved and the path indicating a location of the save folder. The identification information is a folder name, for example. The user can input the save location on the GUI by operating the operation unit 130. When the save location is input, the designator 11 designates the save location. Further, when the save location is not input from the operation unit 130, the designator 11 designates a default save location or the save location input in a previous registration process.

The folder determiner 12 determines whether a folder having identification information that is the same as that of the save folder already exists in the path designated by the designator 11. When the folder already exists, the region mover 13 moves the existing folder to another storage region different from the save location. Another storage region may be a region provided in the storage 120, or may be a region provided in another storage medium different from the storage 120. The creator 14 creates a save folder in the path designated by the designator 11. Thus, the save location of the analysis data file is allocated in the storage 120. As described below, the analysis process is performed by the analysis data acquisition device 20, so that an analysis data file is saved in the save folder.

The file determiner 15 determines whether the analysis data file exists in the save folder. When the analysis data file exists, the registrator 16 allows the database storage device 300 to store the analysis data file. Thus, the analysis data file is registered.

The end determiner 17 determines whether an instruction for ending the registration process has been accepted. The user can instruct the end determiner 17 to end the registration process performed by the analysis database registration device 10 by operating the operation unit 130. When the instruction for ending the registration process is given to the end determiner 17, the region processor 18 makes the save folder unavailable for registration of the analysis data file in the analysis database.

While the region processor 18 makes the save folder unavailable for the registration of the analysis data file in the analysis database by deleting the save folder in the save location in the present embodiment, the present invention is not limited to this. The region processor 18 may move the save folder to another storage region different from the save location or may change the identification information of the save folder. Even in such cases, the save folder can be made unavailable for the registration of the analysis data file in the analysis database.

The analysis data acquisition device 20 includes a designator 21, a folder determiner 22, an executer 23, an acquirer 24 and a saver 25. The controller 110 executes an analysis data acquisition program stored in the storage 120, whereby functions of the constituent elements (21 to 25) of the analysis data acquisition device 20 are implemented. Part or all of the constituent elements (21 to 25) of the analysis data acquisition device 20 may be constituted by hardware such as an electronic circuit.

In response to a user operation of the operation unit 130, the designator 21 allows the display 140 to display a GUI for input of a save location of an analysis data file in the storage 120. The user can input a save location on the GUI by operating the operation unit 130. In this case, the user inputs the save location (the identification information and the path of the save folder) displayed in the display 140 by the analysis database registration device 10. When the save location is input, the designator 21 designates the save location. The folder determiner 22 determines whether a save folder exists in the path designated by the designator 21. In order for the save folder to exist, it is necessary that the analysis database registration program of the analysis database registration device 10 is executed.

When the save folder exists, the executer 23 allows the analysis device 200 to analyze a sample. The acquirer 24 acquires the analysis data indicating the result of analysis by the analysis device 200. The saver 25 saves the analysis data file including analysis data acquired by the acquirer 24 in the save folder in the save location designated by the designator 21. Each analysis data file includes one or a plurality of analysis data pieces acquired by a series of analysis processes by the analysis device 200.

(3) Designation of Save Folder

Next, one example of a method of designating a save folder will be described. The user starts the analysis database registration program of the analysis database registration device 10. Thus, the registration process is started. In this case, the user can allow the display 140 to display a save location designation screen as a GUI for designation of a save location of an analysis data file by operating the operation unit 130.

FIG. 3 is a diagram showing one example of the save location designation screen in the registration process. As shown in FIG. 3, the save location designation screen 141 in the registration process includes a save location input field 141a. The user can designate a save location by inputting a character string indicating the save location in the save location input field 141a while operating the operation unit 130.

In the example of FIG. 3, a character string "C:¥AAAA¥BBBB¥CCCC¥DDDD" is input in the save location input field 141a as the save location. This character string indicates that the path of the save folder is "C:¥AAAA¥BBBB¥CCCC", and the identification information of the save folder is "DDDD". That is, the save folder "DDDD" that is in the region (folder) "CCCC" that is in the region "BBBB" that is in the region "AAAA" that is in the "C drive" of the storage 120 of FIG. 2 is designated as the save location.

The analysis database registration device 10 designates the above-mentioned save location, and creates the save folder "DDDD" in the region designated by the path "C:¥AAAA¥BBBB¥CCCC".

The user starts the analysis data acquisition program of the analysis data acquisition device 20. Thus, the analysis process is started. The user can allow the display 140 to display the save location designation screen as a GUI for designation of a save location of an analysis data file by operating the operation unit 130.

Figure 4:
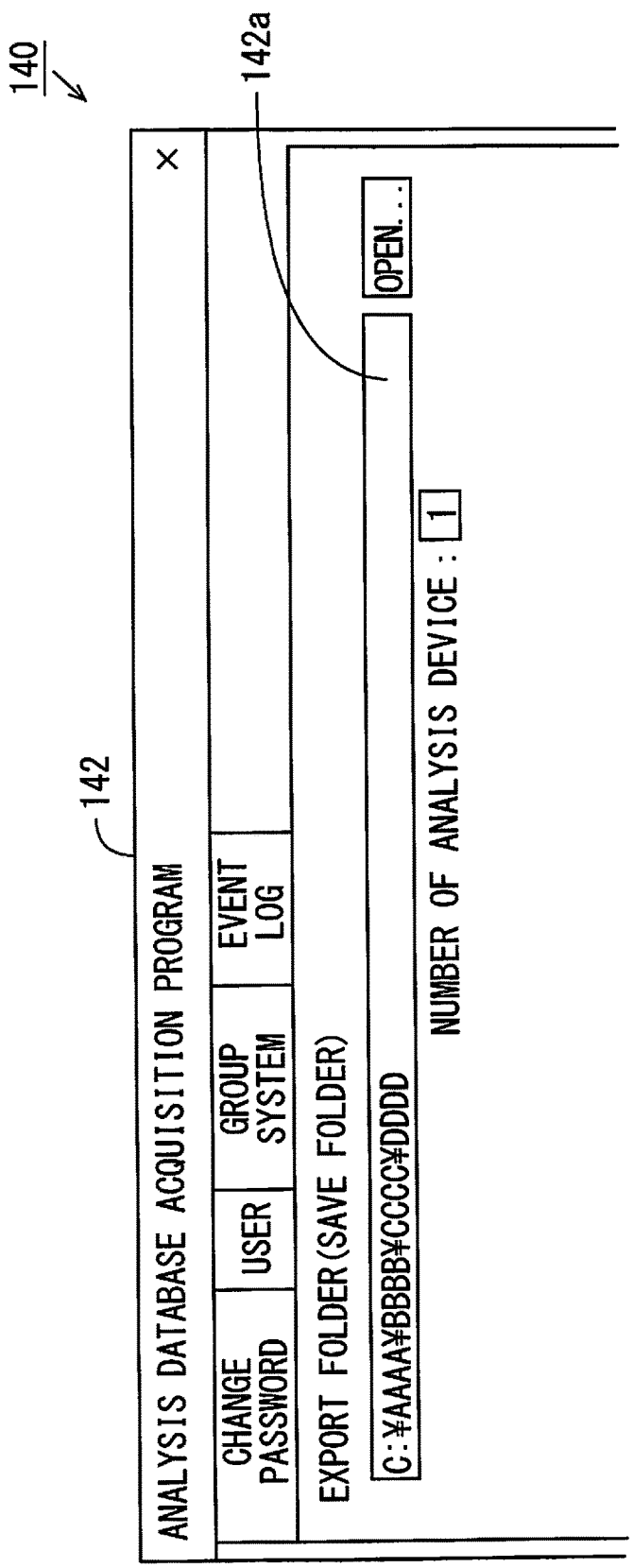
FIG. 4 is a diagram showing one example of a save location designation screen in an analysis process.

FIG. 4 is a diagram showing one example of the save location designation screen in the analysis process. As shown in FIG. 4, the save location designation screen 142 in the analysis process includes a save location input field 142a. The user can designate a save location by inputting the character string indicating the save location in the save location input field 142a while operating the operation unit 130.

In the example of FIG. 4, the save location "C:¥AAAA¥BBBB¥CCCC¥DDDD" that is the same as the save location input in the save location input field 141a of the save location designation screen 141 of FIG. 3 is input in the save location input field 142a. Thus, the save folder "DDDD" is designated as the save location in the designated path "C:¥AAAA¥BBBB¥CCCC".

When the save folder "DDDD" exists in the region designated by the path "C:¥AAAA¥BBBB¥CCCC", the analysis data acquisition device 20 allows the analysis device 200 of FIG. 2 to analyze a sample, and saves the analysis data file in the save folder "DDDD".

The analysis database registration device 10 can register an analysis data file that has not been falsified in the analysis database by allowing the database storage device 300 to store the analysis data file saved in the save folder "DDDD" that is created after the designation of the save location.

Here, the folder "DDDD" may already exist in the path "C:¥AAAA¥BBBB¥CCCC" before the designation of the save location by the analysis database registration device 10. The analysis data file saved in such an existing file has been left vulnerable in terms of security, so that there is a possibility of modification such as falsification of the analysis data file. Thus, the analysis database registration device 10 moves the existing folder to another storage region without registering the analysis data file that is in the existing folder in the analysis database and creates a new save folder "DDDD" in the path "C:¥AAAA¥BBBB¥CCCC". In this case, the data that is saved in the existing file is prevented from being erased.

Further, the user can give an instruction for ending the registration process by operating the operation unit 130. When the instruction for ending the registration process is given, the analysis database registration device 10 deletes the save folder "DDDD" from the save location before ending the registration process.

Thus, after the registration process by the analysis database registration device 10 ends, the save folder "DDDD" does not exist. Therefore, in the case where the data acquisition program of the analysis data acquisition device 20 is started when the analysis database registration program of the analysis database registration device 10 is not executed, the save folder "DDDD" does not exist. In this case, the user is notified of non-existence of the save folder "DDDD" and requested to give an instruction for creation or non-creation of a new save folder "DDDD". Thus, the user can recognize the non-execution of the analysis database registration program.

When recognizing the non-existence of the save folder "DDDD", the user gives an instruction for activating the analysis database registration program of the analysis database registration device 10 using the operation unit 130. Thus, the save folder "DDDD" is created in the path "C:¥AAAA¥BBBB¥CCCC" by the analysis database registration device 10 based on a user operation of the operation unit 130. As a result, the analysis data file including the analysis data acquired by the analysis carried out by the analysis device 200 is saved in the save folder "DDDD", and the analysis data file saved in the save folder "DDDD" is registered in the analysis database.

On the other hand, when the user is notified of non-existence of the save folder "DDDD" and requested to give an instruction for creation or non-creation of a new folder "DDDD", the user can give an instruction for creation of the new holder "DDDD". In this case, the new folder "DDDD" is created by the analysis data acquisition device 20, and the analysis data file including the analysis data acquired by the analysis data acquisition device 20 is saved in the new folder "DDDD". The analysis data file saved in this new folder "DDDD" may be modified by the user or a third person.

However, because the analysis database registration program of the analysis database registration device 10 is not executed, the analysis data file saved in the new folder "DDDD" is not registered in the analysis database. Thereafter, when the analysis database registration program of the analysis database registration device 10 is started, a new save folder is created in the analysis database registration device 10, and the analysis data file saved in the new save folder is registered in the analysis database, and the analysis data file saved in the existing new folder "DDDD" is not registered in the analysis database.

(4) Registration Process and Analysis Process

Figure 5:
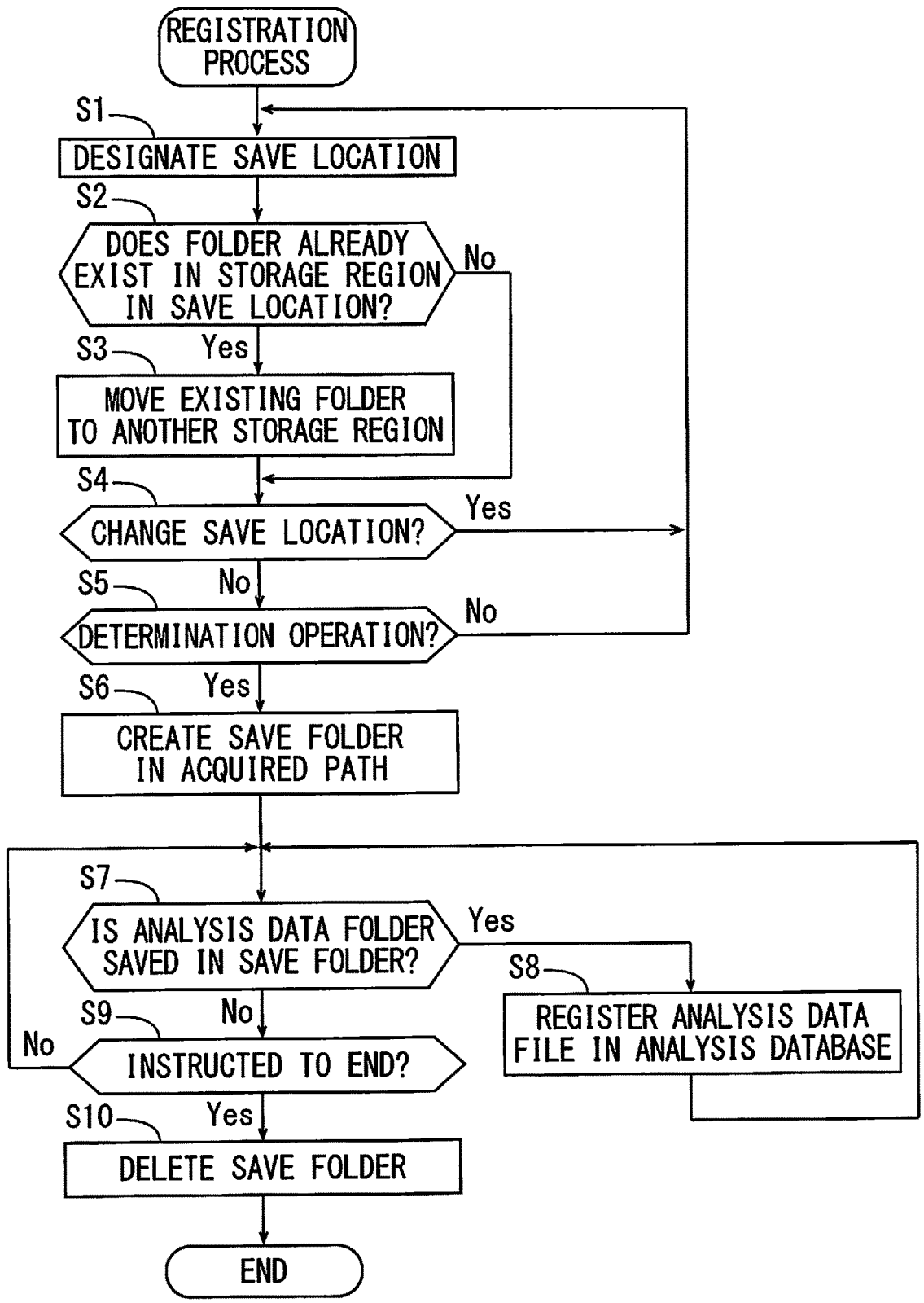
FIG. 5 is a flow chart showing algorithm of the registration process executed by an analysis database registration program.

FIG. 5 is a flow chart showing algorithm of the registration process executed by the analysis database registration program. First, the designator 11 designates a save location of an analysis data file (step S1). Here, the designator 11 designates a default save location or the save location used in a previous registration process until the below-mentioned step S4 is performed. The save location is displayed in the save location input field 141a of the save location designation screen 141 of FIG. 3.

The folder determiner 12 determines whether a folder already exists in the storage region designated by the path of the save location (step S2). When a folder does not exist, the folder determiner 12 proceeds with the step S4. When a folder already exists, the region mover 13 moves the existing folder to another storage region (step S3) and proceeds with the step S4.

In the step S4, the designator 11 determines whether the save location has been changed (step S4). The user can change the save location by inputting a save location in the save location input field 141a of the save location designation screen 141 of FIG. 3 using the operation unit 130 and performing a predetermined designation operation. When the save location is changed, the designator 11 returns to the step S1, and designates the new save location.

When the save location is not changed in the step S4, the designator 11 determines whether a determination operation is performed by the user (step S5). The user performs a predetermined determination operation without changing the save location displayed in the save location input field 141a, thereby being able to proceed with the registration process without changing the save location.

When the determination operation is not performed in the step S5, the designator 11 returns to the step S1. The process of the steps S1 to S5 is repeated until the determination operation is performed. When the determination operation is performed in the step S5, the creator 14 creates a save folder in a storage region in the save location designated in the step S1 (step S6). The analysis process is performed in this state, whereby the analysis data file is saved in the save folder in the step S15 (FIG. 6) of the below-mentioned analysis process.

The file determiner 15 determines whether an analysis data file is saved in the save folder created in the step S6 (step S7). When an analysis data file is saved in the save folder, the registrator 16 registers the analysis data file by storing the analysis data file in the database storage device 300 of FIG. 2 (step S8), and returns to the step S7.

In the step S7, when an analysis data file is not saved in the save folder, the end determiner 17 determines whether an instruction for ending the registration process has been given (step S9). The user can give an instruction for ending the registration process to the end determiner 17 by operating the operation unit 130. When the instruction for ending the registration process is not given, the end determiner 17 returns to the step S7. When the instruction for ending the registration process is given, the region processor 18 deletes the save folder created in the step S6, and ends the registration process.

Figure 6:
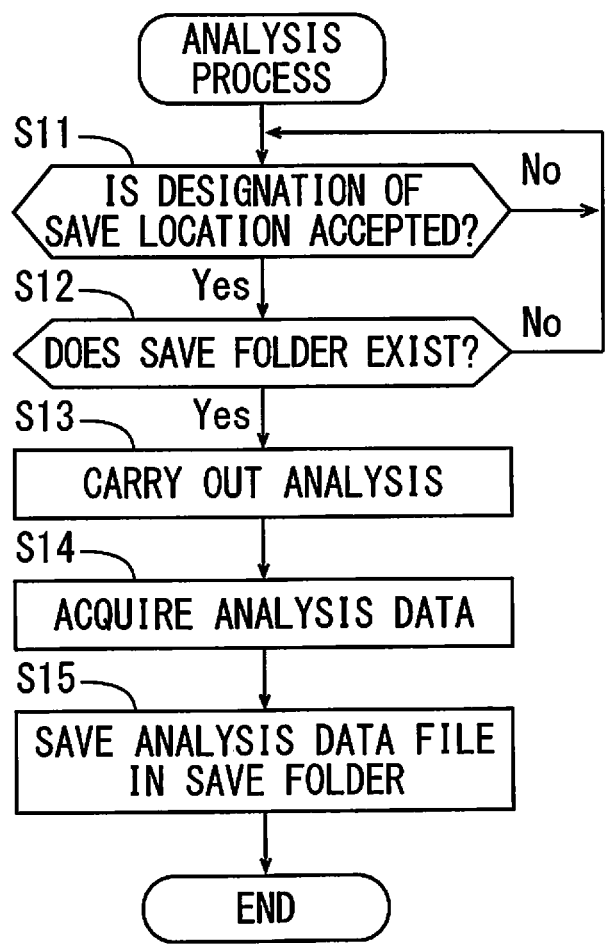
FIG. 6 is a flow chart showing algorithm of the analysis process executed by an analysis data acquisition program.

FIG. 6 is a flow chart showing the algorithm of the analysis process executed by the analysis data acquisition program. First, the designator 21 determines whether designation of a save location has been accepted (step S11). The user can designate the save location by inputting the save location in the save location input field 142a of the save location designation screen 142 of FIG. 4 using the operation unit 130 and performing the predetermined designation operation.

When the designation of the save location has not been accepted, the designator 21 waits until designation of a save location is accepted. When the designator 21 accepts the designation of the save location, the folder determiner 22 determines whether a save folder exists in the storage region in the save location designated in the step S11 (step S12). When the registration process is performed, the save folder is created in the step S6 of the registration process. Thus, the save folder exists.

When a save folder does not exist, the folder determiner 22 returns to the step S11. The process of the steps S11, S12 is repeated until a save folder is created, that is, until the step S6 of the registration process is performed. When a save folder exists, the executer 23 allows the analysis device 200 of FIG. 2 to analyze a sample (step S13).

The acquirer 24 acquires the analysis data indicating a result of analysis from the analysis device 200 (step S14). The saver 25 saves the analysis data file including the analysis data acquired in the step S14 in the save folder in the save location designated in the step S11 (step S15), and ends the analysis process.

(5) Effects

In the analysis database registration device 10 according to the present embodiment, the save location in which the analysis data acquisition device 20 saves the analysis data file is created in the storage 120. The analysis data acquisition device 20 saves the analysis data file including the analysis data acquired from the analysis device 200 in the save folder in the created save location. When it is determined that an analysis data file is saved in the save folder, the analysis data file is registered in the analysis database of the database storage device 300. Further, when it is determined that an instruction for ending the registration of the analysis data file has been given, the save folder is deleted from the save location.

With this configuration, the analysis data acquisition device 20 can save the analysis data file in the save folder that is created by the analysis database registration device 10 when the analysis database registration device 10 is in operation. On the other hand, when the analysis database registration device 10 is not in operation, the save folder to be used in order for the analysis data acquisition device 20 to save the analysis data file does not exist. Therefore, the analysis data file is not saved in the save folder by the analysis data acquisition device 20. While the analysis data file saved in the save folder created by the analysis database registration device 10 is registered in the analysis database, the analysis data file saved in another folder is not registered in the analysis database. Thus, the analysis data file that is left vulnerable in terms of security is prevented from being registered in the analysis database. As a result, reliability of the analysis data registered in the analysis database can be improved.

Further, in this case, the user is notified of non-existence of a save folder and requested to give an instruction for creation or non-creation of a new save folder. Thus, the user can recognize that the analysis database registration program is not executed. Therefore, the analysis process is prevented from being performed by the analysis data acquisition device 20 when the registration process not performed by the analysis database registration device 10.

(6) Correspondences between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the folder determiner 12 and the end determiner 17 are examples of first and second determiners, respectively, and the designator 11 is an example of a designator.

As each of various elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

We claim:

1. An analysis database registration device that registers an analysis data file including analysis data acquired by an analysis data acquisition device from an analysis device, in an analysis database via a temporary storage which is different from the analysis database, the analysis database storing the analysis data from the analysis device, comprising:
at least one processor configured to implement:
a creator that creates a save region to be used in order for the analysis data acquisition device to save the analysis data file in the save region of the temporary storage, the save region being a location of the storage at which the analysis data file cannot be falsified by a user;
a first determiner that determines whether the analysis data file is saved in the save region created by the creator;
a second determiner that determines whether an instruction for ending registration of the analysis data file into the analysis database by the registrator is received; and
a region processor that configures the save region created by the creator to be unavailable for the registration of the analysis data file into the analysis database based on the second determiner determining that the instruction for ending the registration of the analysis data file is receive; and
a registrator that
registers the analysis data file that is saved in the save region into the analysis database based on a determination that the analysis data file is saved in the save region and the save region is not configured to be unavailable for the registration of the analysis data into the analysis database, and
does not register the analysis data file that is saved in the save region into the analysis database based on a determination that the save region is configured to be unavailable for the registration of the analysis data into the analysis database.

2. The analysis database registration device according to claim 1, wherein
the region processor is configured to delete the save region created by the creator based on the second determiner determining that the instruction for ending the registration of the analysis data file is received.

3. The analysis database registration device according to claim 1, wherein the at least one processor is further configured to implement:
a designator that designates a location of the save region to be created by the creator and identification information for identifying the save region based on a user operation,
wherein the creator creates the save region in the storage based on the location of the save region and the identification information designated by the designator.

4. The analysis database registration device according to claim 3, wherein the at least one processor is further configured to implement:
a region mover that moves an existing save region to another location when the save region identified by the identification information already exists in the location designated by the designator.

5. An analysis data collection system that collects an analysis data file including analysis data acquired by an analysis device as an analysis database, comprising:
an analysis data acquisition device that acquires analysis data from the analysis device;
a storage; and
the analysis database registration device according to claim 1 that registers the analysis data file including the analysis data acquired by the analysis data acquisition device in the analysis database via the storage, wherein
the analysis data acquisition device saves the analysis data file including the analysis data acquired from the analysis device in a save region created in the storage by the analysis database registration device.

6. An analysis system comprising:
an analysis device that acquires analysis data indicating a result of analysis by analyzing a sample;
a database storage device that stores an analysis database; and
the analysis data collection system according to claim 5 that collects an analysis data file including analysis data acquired by the analysis device as an analysis database, wherein
the registrator of the analysis data collection system registers an analysis data file that is saved in the save region in the analysis database of the database storage device.

7. The analysis database registration device according to claim 1, wherein the analysis data acquired from the analysis device includes chromatograph data of a sample.

8. An analysis database registration method for registering an analysis data file including analysis data acquired by an analysis data acquisition device from an analysis device in an analysis database via a temporary storage which is different from the analysis database, the analysis database storing the analysis data from the analysis device, the method comprising:
creating a save region to be used in order for the analysis data acquisition device to save the analysis data file in the save region of the temporary storage, the save region being a location of the storage at which the analysis data file cannot be falsified by a user;
determining whether the analysis data file is saved in the created save region;
determining whether an instruction for ending registration of the analysis data file into in the analysis database is received; and
configuring the save region to be unavailable for the registration of the analysis data file into the analysis database based on determining that the instruction for ending the registration of the analysis data file is received; and
registering the analysis data file that is saved in the save region in the analysis database based on a determination that the analysis data file is saved in the save region and the save region is not configured to be unavailable for the registration of the analysis data into the analysis database, and not registering the analysis data file that is saved in the save region into the analysis database based on a determination that the save region is configured to be unavailable for the registration of the analysis data into the analysis database.

\* \* \* \* \*